United States Patent
Tudosie et al.

(10) Patent No.: US 10,396,857 B2
(45) Date of Patent: Aug. 27, 2019

(54) DATA TRANSMISSION

(71) Applicant: Infineon Technologies AG, Neubiberg (DE)

(72) Inventors: Mihai Tudosie, Lieboch (AT); Peter Raggam, Sankt Stefan im Rosental (AT); Calin Bira, Bucharest (RO); Alexandr Caragheorghii, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 237 days.

(21) Appl. No.: 13/862,770

(22) Filed: Apr. 15, 2013

(65) Prior Publication Data

US 2014/0308894 A1  Oct. 16, 2014

(51) Int. Cl.
*H04B 5/00* (2006.01)
*H04B 5/02* (2006.01)

(52) U.S. Cl.
CPC ......... *H04B 5/0037* (2013.01); *H04B 5/0031* (2013.01); *H04B 5/02* (2013.01)

(58) Field of Classification Search
USPC ...... 455/41.1, 41.2, 41.3, 558, 106, 39, 343, 455/572, 127, 80, 69, 126; 340/10.2, 340/572.2, 572.4, 10.33, 10.1, 10.4
See application file for complete search history.

(56) References Cited

U.S. PATENT DOCUMENTS

| | | | | |
|---|---|---|---|---|
| 6,307,428 B1 * | 10/2001 | Nebel | ................ | G06K 7/0008 329/311 |
| 6,427,065 B1 * | 7/2002 | Suga | .................... | G06K 7/0008 235/492 |
| 8,797,163 B2 * | 8/2014 | Finkenzeller | ........ | G06K 7/0008 340/10.1 |
| 2007/0145135 A1 * | 6/2007 | Jogand-Coulomb et al. ............... 235/451 | | |
| 2009/0011706 A1 * | 1/2009 | Wilson | ..................... | H04B 5/02 455/41.1 |
| 2010/0239265 A1 * | 9/2010 | Henderson | ............... | H04B 3/54 398/115 |
| 2010/0291871 A1 * | 11/2010 | Butler | ................ | G06K 19/0701 455/41.1 |
| 2011/0171996 A1 * | 7/2011 | Narendra | ........... | G06K 19/0701 455/558 |
| 2012/0021683 A1 * | 1/2012 | Ma et al. | ..................... | 455/41.1 |
| 2012/0100804 A1 * | 4/2012 | Miles | ................... | G06K 7/0008 455/41.1 |
| 2012/0108169 A1 * | 5/2012 | Degauque | .......... | G06K 7/10247 455/41.1 |
| 2016/0252922 A1 * | 9/2016 | Reifenhauser | ............ | G05F 1/66 700/295 |

* cited by examiner

*Primary Examiner* — Ganiyu A Hanidu
(74) *Attorney, Agent, or Firm* — Murphy, Bilak & Homiller, PLLC

(57) ABSTRACT

A method for data transmission, wherein a first element conveys electrical power to a second element via an electrical supply line, and wherein the second element transmits data to the first element by modulating a current conveyed via the electrical supply line.

70 Claims, 4 Drawing Sheets

DATA TRANSMISSION

BACKGROUND OF THE INVENTION

Embodiments of the present invention relate to data transmission between elements, in particular between semiconductor elements such as integrated circuits, chip cards, secure elements, near-field communication devices, or the like.

SUMMARY

A first embodiment relates to a method for data transmission, wherein a first element conveys electrical power to a second element via an electrical supply line, and wherein the second element transmits data to the first element by modulating a current conveyed via the electrical supply line.

A second embodiment relates to a method for data transmission, wherein a first element conveys electrical power to a second element via an electrical supply line, wherein the second element transmits data to the first element by modulating a current conveyed via the electrical supply line, and wherein the first element transmits data to the second element by modulating a voltage conveyed via the electrical supply line.

A third embodiment relates to a first device comprising a connection to a second device, wherein the first device is arranged for supplying electrical power to the second device via the connection, and wherein the first device is arranged for determining data transmitted from the second device by measuring a current supplied to the second device.

A fourth embodiment is directed to a second device comprising a connection to a first device supplying electrical power to the second device, wherein the second device is arranged to transmit data to the first device by modulating a current conveyed via the electrical supply line.

A fifth embodiment relates to a substrate comprising a first device and a second device, wherein the first device conveys electrical power to the second device via an electrical supply line, and wherein the second device is arranged to transmit data to the first device by modulating a current conveyed via the electrical supply line.

A sixth embodiment is directed to a system for data transmission via an electrical supply line, wherein a first element conveys electrical power to a second element via the electrical supply line, comprising means for transmitting data from the second element to the first element by modulating a current conveyed via the electrical supply line.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
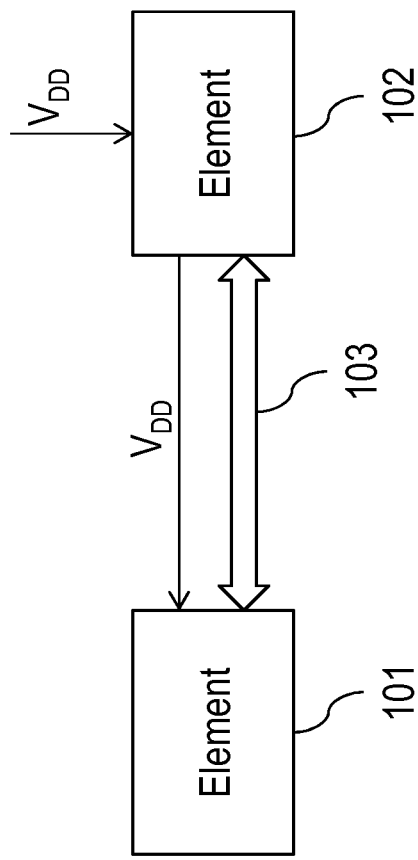
FIG. 1 shows a schematic block diagram comprising two elements, wherein electrical power is supplied from a first element to a second element, wherein the electrical power supplied is utilized for communicating data from the second to the first element via current modulation and optionally also from the first to the second element via voltage modulation.

Near field communication (NFC) in particular relates to a set of standards for mobile devices to establish radio communication over a close range, usually not more than a few centimeters. Communication is also possible between an NFC device and an unpowered NFC chip, called a "tag" (see, e.g., http://en.wikipedia.org/wiki/Near_field_communication).

In the context of NFC, a secure element (SE) may be connected to an NFC analog frontend chip. This connection may be realized via a transparent communication interface, which may be realized as an analog or digital interface. If the settings of the analog frontend chip are to be changed during runtime, a separate configuration channel may become necessary, in particular for scenarios where the communication interface cannot be used for configuration purposes.

One possibility to handle the communication channel is to use a secure element which has an additional serial interface (e.g., a serial peripheral interface, SPI). However, such additional interface increases the costs and the complexity of the solution.

Embodiments of the present invention modulate the current consumption of the secure element. As the analog frontend chip monitors the secure element's current consumption, the analog frontend chip can determine an information based on the current consumed by the secure element. Hence, data transmission from the secure element to the analog frontend chip can be achieved by such modulation of the current consumption at the secure element. In such a scenario, the secure element is powered via the analog frontend chip.

The solution presented may use current modulation over a supply line of the device to send data. The modulation can be achieved by switching the current consumed at the secure element between at least two states. Also, a different number of states other than two can be used, e.g., with different current consumptions. Preferably, the current modulation is realized in such a manner that it does not impair the operation of the secure element and that it can be detected by the current supplying element, here the analog frontend chip. The current consumed by the secure element can be measured by the analog frontend chip via a voltage drop over a switch, e.g., a MOSFET. However, other means of current measurement within the analog frontend chip are known and can be utilized accordingly.

It is noted that the analog frontend chip may be any element supplying power to the secure element. The analog frontend chip monitors the current consumption hence deriving the information transmitted from the secure element to the analog frontend chip. Hence, the solution enables configuration data to be conveyed from the secure element to the analog frontend chip during runtime of a communication interface.

It is noted that the solution is not limited to the secure element and the analog frontend chip. These are only exemplary components of an NFC scenario.

It is further noted that the modulation addressed herein may be any modulation comprising in particular an amplitude or a phase modulation, e.g. a load modulation that results in a subcarrier modulation where data is transmitted by a phase modulation of this subcarrier.

FIG. 1 shows an element 101 (also referred to as "second element" or "second device") and an element 102 (also referred to as "first element" or "first device"), wherein electrical power is supplied to the element 102 as indicated by a supply voltage $V_{DD}$. The element 102 conveys the supply power $V_{DD}$ to the element 101. Also, FIG. 1 shows a communication interface 103 between the elements 101 and 102. The communication interface can be a contactless communication interface, e.g., an NFC wired interface (NFC-WI) according to or based on ECMA 373 or ISO/IEC 28361:2007.

The element 101 can be a secure element and the element 102 can be an integrated circuit, e.g., an analog frontend chip. The elements 101 and 102 can be deployed on a single medium or on separate media. The element 101 may be located on a substrate, in particular on a SIM card or a microSD card.

Figure 2:
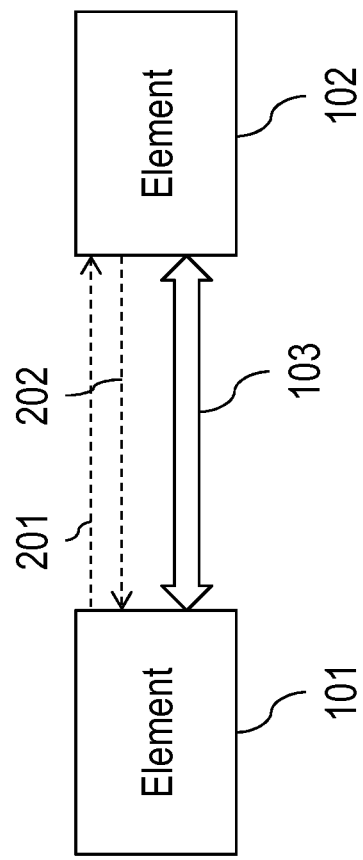
FIG. 2 is based on FIG. 1 and visualizes a bidirectional data communication between the first element and the second element via the electrical supply line.

FIG. 2 shows the same elements 101 and 102 as well as the communication interface 103. Although the electrical power is supplied as is shown by the supply voltage $V_{DD}$ in FIG. 1, a data transmission 201 from the element 101 to the element 102 and a data transmission 202 from the element 102 to the element 101 can be realized in parallel to and independent from the communication interface 103 by utilizing the supply voltage $V_{DD}$ as follows:

The data transmission 201 is achieved by modulating a current at the element 101. As the current consumption of the element 101 is monitored by the element 102, the element 101 can, e.g., switch between two current values (one current value representing a bit "0", the other a bit "1"), thereby conveying a sequence of bits, e.g., "0011101011011 . . . " to the element 102. This represents a data transmission 201 that can be used for configuring or controlling the element 102 by the element 101.

The data transmission 202 works in the opposite direction: The element 102 conveys information by changing the voltage of the supply voltage $V_{DD}$, e.g., switching between two voltage values (one representing a bit "0", the other a bit "1"), thereby conveying a sequence of bits to the element 101.

It is noted that the current values that may be selected to differentiate between two bits (maybe more than two bits) may still be larger than a threshold value that supplies an amount of current for operating the element 101. Accordingly, the modulation of the supply voltage $V_{DD}$ may be in a range that does not affect a proper operation of the element 101.

It is further noted that the above refers to an exemplary scenario. Accordingly, more than two values of current and/or voltage could be used to convey information for more than two states. For example, a selection between four current values could be used to convey a 2-bit-information at a single moment in time. Various coding and/or modulation schemes can be utilized accordingly.

Figure 3:
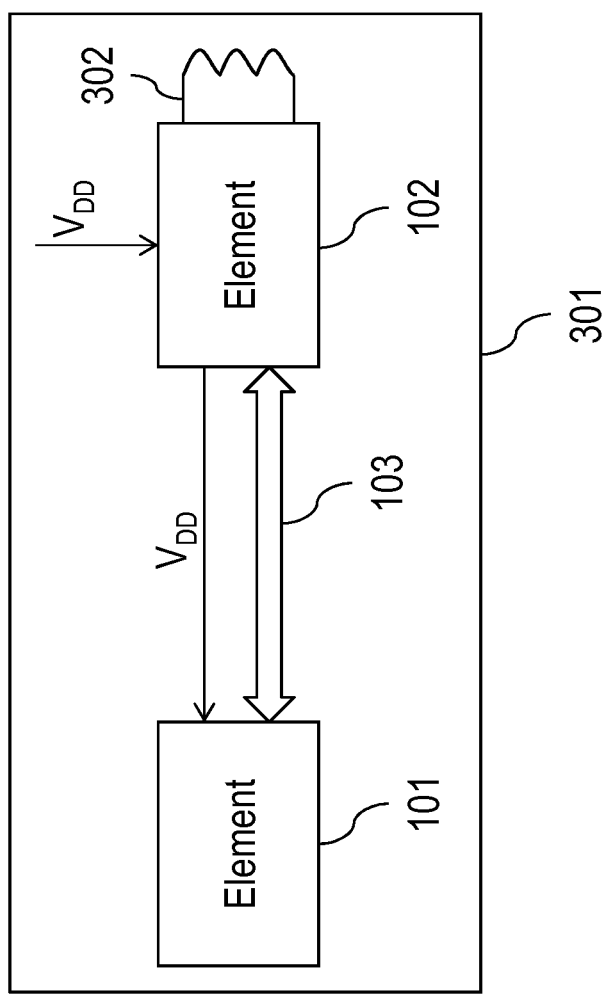
FIG. 3 shows an exemplary use case scenario based on FIG. 1 for a chip card utilizing NFC.

FIG. 3 shows an exemplary use case scenario comprising the elements 101, 102 as well as the communication interface 103 and the supply voltage $V_{DD}$ according to FIG. 1 above. The signal of the supply voltage $V_{DD}$ can be used for data transmission purposes between the elements 101 and 102 (in addition to the communication interface 103) as described above.

In addition, the element 102 is coupled to an antenna 302 for conveying information, e.g., via NFC to an antenna of another component, e.g., reader (not shown in FIG. 3). The elements 101, 102 and the antenna 302 may be arranged on a chip card 301, optionally together with an energy source (e.g., battery) for providing the supply voltage $V_{DD}$.

The element 101 can be a secure element of the chip card 301 and the element 102 can be an NFC chip, in particular an NFC analog frontend chip. The communication interface 103 may be implemented as, e.g., NFC-WI interface.

Figure 4:
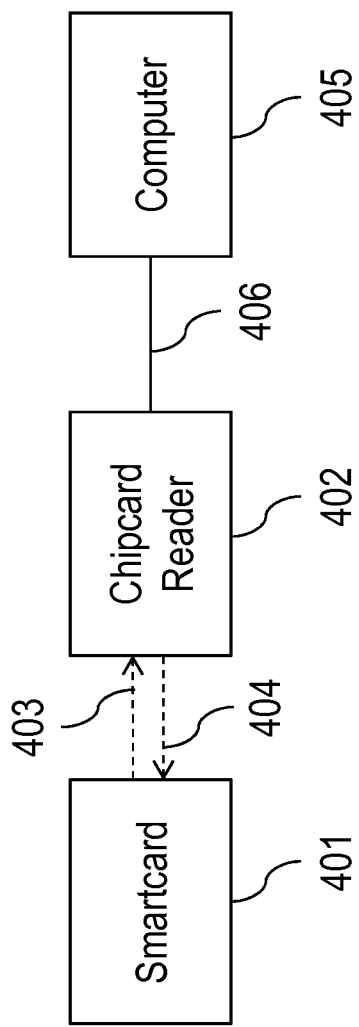
FIG. 4 shows an alternative implementation comprising a smart card connected with a chip card reader.

FIG. 4 shows an alternative implementation for the solution presented. A smart card 401 can be connected with a chip card reader 402, e.g., via direct contact. The chip card reader 402 is connected 406, e.g., via Ethernet or USB to a computer 405 (or a network). This implementation may utilize a return-to-zero (RZ) or a non-return-to-zero (NRZ) coding scheme.

The chip card reader 402 provides power supply to the smart card 401. A data transmission 403 from the smart card 401 to the chip card reader 402 can be achieved by modulating the current of the power supply and a data transmission 404 from the chip card reader 402 to the smart card 401 can be achieved by modulating the voltage of the power supply.

For example, with regard to the data transmission 404 the chip card reader 402 may convey different voltages as follows:
  a voltage amounting to 3V indicates an idle state;
  a transition to a voltage amounting to 5V indicates logic "1"; and
  a transition to a voltage amounting to 1.8V indicates logic "0".

For example, with regard to the data transmission 403 the smart card 401 modulates the current conveyed from the chip card reader 402 to the smart card 401 as follows:
  a current amounting to 6 mA indicates an idle state;
  a transition to a current less than 6 mA (e.g., 4 mA) indicates logic "0"; and
  a transition to a current larger than 6 mA (e.g., 10 mA or higher) indicates logic "1".

If the smart card 401 usually draws a current amounting to 6 mA, a deviation from that value can be measured at the chip card reader 402 thereby determining whether a "0" or "1" was sent by the smart card 401 to the reader 402.

For conveying data, a single wire protocol (SWP) may be used. Voltage and/or current may be modulated via on-off-keying (OOK). The chip card reader 402 preferably has a current measurement device to determine the current that is actually consumed by the smart card 401.

The current modulation may utilize a current limitation feature: An element (smart card, chip, etc.) can—on average—lower its power consumption to a predetermined value, which in fact corresponds to a modulation. The operation of the element can be maintained (fully or partially) during such low power consumption state. As an alternative, the element may also increase its power consumption as described herein.

Advantageously, data transmission utilizing the modulation as suggested can be achieved via two electrical wires, e.g., supply voltage $V_{DD}$ and ground. No further data pin is required. Also, existing pins (ground and $V_{DD}$) can be used, which makes the provided solution efficient and inexpensive.

An exemplary use case scenario that could be applied with regard to FIG. 4 is using a MicroPross MP300 TC3 reader as chip card reader 402 and an SLE97 ARM based smart card 401. A return-to-zero modulation comprising 3 states (or any other protocol) can be used to convey data by modulating the current and/or voltage as described.

As the chip of the smart card has an ARM core and peripherals, it can draw a current of more than 6 mA even in idle state.

Figure 5:
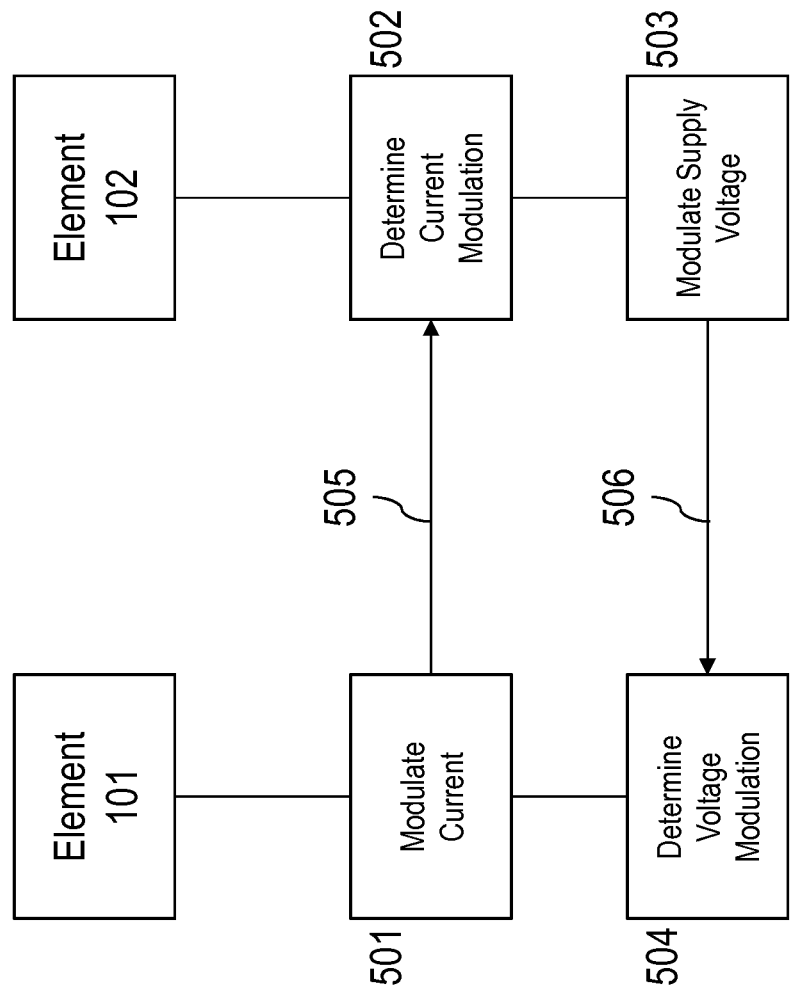
FIG. 5 shows a schematic diagram visualizing the various modulations between the two elements shown in FIG. 2 in order to convey data in a bidirectional fashion between those elements.

FIG. 5 shows a schematic diagram comprising the element 101 (or smart card 401) and the element 102 (or chip card reader 402), wherein a data transmission 505 from the element 101 to the element 102 is achieved by modulating the current of a power supply (see step 501) at the element 101 and by demodulating or determining the current modulation in a step 502.

A data transmission 506 in the opposite direction from the element 102 to the element 101 is achieved by modulating a voltage of the power supply (see step 503) at the element 102 and demodulating or determining the voltage modulation in a step 504.

In addition, a timer can be used to define a duration of a signal, e.g., a bit duration. For coding purposes, various codes can be used. One example is the Manchester coding (also known as Phase Encoding, or PE), which is a line code in which the encoding of each data bit has at least one transition and occupies the same time; it therefore does not have any DC component, and is self-clocking, which means that it may be inductively or capacitively coupled, and that a clock signal can be recovered from the encoded data (see: http://en.wikipedia.org/wiki/Manchester_code).

However, as the solution can be realized using software (executed by an appropriate processing element), there is a high degree of flexibility regarding the coding scheme.

Advantageously, as this solution can be realized with software it can be utilized for any secure element. Also, the solution is cost efficient and can be transparent to yet existing functionalities. Hence, the solution is in compliance and compatible with existing chip card standards.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using an appropriate processor and the appropriate processor instructions, or in hybrid implementations that utilize a combination of hardware logic and software logic to achieve the same results. Such modifications to the inventive concept are intended to be covered by the appended claims.

What is claimed is:

1. A method for data transmission, the method comprising:
   conveying electrical power from a first element to a second element via an electrical power supply line that is physically connected between the first element and the second element;
   transmitting data from the second element to the first element by modulating a current conveyed via the electrical power supply line,
   wherein the first element is a chip, wherein the second element and the chip are connected via an communication interface.

2. The method according to claim 1, wherein the second element is a secure element, in particular a security controller.

3. The method according to claim 1, wherein the second element is located on a substrate, in particular on a SIM card or a microSD card.

4. The method according to claim 2, wherein the first element is an NFC analog frontend chip or a transceiver chip.

5. The method according to claim 4, wherein the communication interface comprises an analog interface or a digital interface.

6. The method according to claim 4, wherein the chip is connected to an antenna for conveying NFC signals to a reader.

7. The method according to claim 4, wherein the chip is connected to an antenna for receiving NFC signals from a reader.

8. The method according to claim 6, wherein the chip, the secure element and the antenna are arranged on a substrate, in particular a SIM card or a microSD card, or integrated in a device, in particular a mobile phone or any other consumer device.

9. The method according to claim 1, wherein said data transmitted to the first element comprises configuration data, in particular for a configuration of communication parameters of the first element.

10. The method according to claim 1, wherein the second element is a smart card and the first element is a smart card reader.

11. The method according to claim 1, wherein the first element determines the data transmitted from the second element by measuring the current supplied to the second element.

12. The method according to claim 1, wherein modulating the current comprises setting the current to one of at least two values.

13. The method according to claim 12, wherein setting the current to one of at least two values ensures partial or full operation of the second element.

14. The method according to claim 1, wherein modulating the current comprises modulating an amplitude or a phase of the current.

15. The method according to claim 1, wherein modulating the current comprises a return-to-zero modulation or an on-off-keying modulation.

16. A method for data transmission, comprising:
   conveying electrical power from a first element to a second element via an electrical power supply line that is physically connected between the first element and the second element, transmitting data from the second element to the first element by modulating a current conveyed via the electrical power supply line, and transmitting data from the first element to the second element by modulating a voltage conveyed via the electrical power supply line; wherein the first element is a chip, wherein the second element and the chip are connected via an communication interface.

17. The method according to claim 16, wherein the second element is a secure element, in particular a security controller.

18. The method according to claim 17, wherein the first element is an NFC analog frontend chip or a transceiver chip.

19. The method according to claim 18, wherein the communication interface comprises an analog interface or a digital interface.

20. The method according to claim 18, wherein the chip is connected to an antenna for conveying NFC signals to a reader.

21. The method according to claim 18, wherein the chip is connected to an antenna for receiving NFC signals from a reader.

22. The method according to claim 20, wherein the chip, the secure element and the antenna are arranged on a substrate, in particular a SIM card or a microSD card, or integrated in a device, in particular a mobile phone or any other consumer device.

23. The method according to claim 16, wherein said data transmitted to the first element comprises configuration data in particular for communication parameters of the first element.

24. The method according to claim 16, wherein the second element is a smart card and the first element is a smart card reader.

25. The method according to claim 16, wherein the first element determines the data transmitted from the second element by measuring the current supplied to the second element.

26. The method according to claim 16, wherein modulating the current comprises setting the current to one of at least two values.

27. The method according to claim 26, wherein setting the current to one of at least two values ensures partial or full operation of the second element.

28. The method according to claim 16, wherein modulating the current comprises modulating an amplitude.

29. The method according to claim 16, wherein modulating the current comprises a load modulation that results in a subcarrier modulation where data is transmitted by a phase modulation of a subcarrier.

30. The method according to claim 16, wherein modulating the current comprises a return-to-zero modulation or an on-off-keying modulation.

31. The method according to claim 16, wherein the second element determines the data transmitted from the first element by demodulating the voltage, in particular via voltage levels, supplied to the second element.

32. The method according to claim 16, wherein modulating the voltage comprises setting the voltage to one of at least two values.

33. The method according to claim 26, wherein setting the voltage to one of at least two values ensures partial or full operation of the second element.

34. The method according to claim 16, wherein modulating the voltage comprises modulating an amplitude of the voltage.

35. The method according to claim 16, wherein modulating the voltage comprises a load modulation that results in a subcarrier modulation where data is transmitted by a phase modulation of a subcarrier.

36. The method according to claim 16, wherein modulating the voltage comprises a return-to-zero modulation or an on-off-keying modulation.

37. A first device, comprising: a physical connection to a second device, wherein the first device is arranged for supplying electrical power to the second device via the connection, and wherein the first device is arranged for determining data transmitted from the second device by measuring a current supplied to the second device; wherein the first device is a chip, wherein the second device and the chip are connected via an communication interface.

38. The first device according to claim 37, wherein the connection to the second device is an electrical power supply line.

39. The first device according to claim 37, wherein the first device is arranged to transmit data to the second device by modulating a voltage conveyed via the connection.

40. The first device according to claim 39, wherein modulating the voltage comprises setting the voltage to one of at least two values thereby in particular ensuring partial or full operation of the second device.

41. The first device according to claim 39, wherein modulating the voltage comprises modulating an amplitude.

42. The first device according to claim 39, wherein modulating the voltage comprises a load modulation that results in a subcarrier modulation where data is transmitted by a phase modulation of a subcarrier.

43. The first device according to claim 39, wherein modulating the voltage comprises a return-to-zero modulation, a non-return-to-zero modulation or an on-off-keying modulation.

44. The first device according to claim 39, wherein the first device is an NFC analog frontend chip or a transceiver chip.

45. The first device according to claim 37, wherein the first device is further connected to the second device via a communication interface.

46. The first device according to claim 37, wherein the first device is arranged to be configured by the data transmitted from the second device, wherein said data transmitted in particular comprise NFC configuration data for the first device.

47. A second device, comprising:
a connection to a first device supplying electrical power to the second device, and
wherein the second device is arranged to transmit data to the first device by modulating a current conveyed via the electrical power supply line.

48. The second device according to claim 47, wherein the second device is arranged for determining data transmitted from the first device by demodulating a voltage supplied via the electrical power supply line.

49. The second device according to claim 47, wherein the second device is a secure device, in particular a secure device on a substrate, in particular a SIM card, a microSD card or a chip card.

50. The second device according to claim 47, wherein the second device is a smart card.

51. The second device according to claim 47, wherein the second device is further connected to the first device via a communication interface.

52. The second device according to claim 47, wherein said data transmitted to the first device comprises configuration data in particular for an NFC configuration of the first device.

53. The second device according to claim 47, wherein modulating the current comprises setting the current to one of at least two values.

54. The second device according to claim 53, wherein setting the current to one of at least two values ensures partial or full operation of the second device.

55. The second device according to claim 47, wherein modulating the current comprises modulating an amplitude of the current.

56. The second device according to claim 47, wherein modulating the current comprises a load modulation that results in a subcarrier modulation where data is transmitted by a phase modulation of a subcarrier.

57. The second device according to claim 47, wherein modulating the current comprises a return-to-zero modulation, a non-return-to zero modulation or an on-off-keying modulation.

58. A substrate, comprising:
a first device, and
a second device,
wherein the first device conveys electrical power to the second device via an electrical power supply line that is physically connected between the first element and the second element, and
wherein the second device is arranged to transmit data to the first device by modulating a current conveyed via the electrical power supply line.

59. The substrate according to claim 58, wherein the first device is arranged for determining data transmitted from the second device by measuring the current supplied to the second device.

60. The substrate according to claim 58 further comprising:
an antenna coupled to the first device, and
an energy source connected to the first device providing said electrical power.

61. The substrate according to claim 58 further comprising a communication interface between the first device and the second device, wherein the communication interface in particular is an analog interface or a digital interface.

62. The substrate according to claim 58 being coupled via NFC to a NFC reader.

63. The substrate according to claim 58, wherein the first device is a chip, in particular an NFC analog frontend chip.

64. The substrate according to claim 58, wherein the second device is a secure device, in particular a security controller.

65. The substrate according to claim 58, wherein the second device is a smart card.

66. A system for data transmission via an electrical power supply line, the system comprising:
a first element adapted to convey electrical power to a second element via the electrical power supply line, the electrical power supply line physically connecting the first element to the second element, and means for transmitting data from the second element to the first element by modulating a current conveyed via the electrical power supply line; wherein the first element is a chip, wherein the second element and the chip are connected via an communication interface.

67. The system according to claim 66, further comprising means for transmitting data from the first element to the second element by modulating a voltage conveyed via the electrical power supply line.

68. The system according to claim 67, further comprising means for determining the data transmitted from the first element to the second element by demodulating the modulated voltage supplied to the second element.

69. The system according to claim 67, further comprising means for determining the data transmitted from the second element by measuring the current at the first element supplied to the second element.

70. The system according to claim 66, wherein the first element and the second element are connected via an communication interface.

* * * * *